United States Patent [19]
Sweetman

[11] Patent Number: 6,070,924
[45] Date of Patent: Jun. 6, 2000

[54] ELECTRICAL PLUG EXTRACTION DEVICE

[76] Inventor: Patricia Sweetman, 306 W. Taylor St., Taylor, Pa. 18517

[21] Appl. No.: 09/175,893

[22] Filed: Oct. 20, 1998

[51] Int. Cl.[7] ........................................................ B25J 1/04
[52] U.S. Cl. ............................ 294/24; 294/19.1; 294/902; 254/131
[58] Field of Search ............................... 294/19.1, 22, 23, 294/24, 50.6, 902; 254/131, 131.5, 132; 439/480, 481, 483

[56] References Cited

U.S. PATENT DOCUMENTS

| | | | |
|---|---|---|---|
| 927,546 | 7/1909 | Johnston | 294/19.1 |
| 2,326,676 | 8/1943 | Peters | 294/19.1 |
| 3,091,491 | 5/1963 | Adler | 294/22 |
| 3,985,382 | 10/1976 | Wheeler | 294/50.6 |
| 4,123,882 | 11/1978 | Case et al. | 294/19.1 |
| 4,210,377 | 7/1980 | LaVoque | 339/45 R |
| 4,307,924 | 12/1981 | Gibbs | 339/110 P |
| 5,062,803 | 11/1991 | Howard et al. | 439/160 |
| 5,553,905 | 9/1996 | Bentivegna | 294/24 |
| 5,690,508 | 11/1997 | Atkinson | 439/484 |
| 5,823,590 | 10/1998 | Forrest et al. | 294/24 |
| 5,855,358 | 1/1999 | Witter | 254/132 |

*Primary Examiner*—Dean J. Kramer
*Attorney, Agent, or Firm*—Henderson & Sturm LLP

[57] ABSTRACT

An electrical plug extraction device 10 including an elongated handle member 20 having a curved lever portion 21 and having a first 30 and a second 40 plug gripping element formed on the opposite ends 22, 23 of the handle member 20. Each plug gripping element 30, 40 has an opening provided with a pair of ridged tooth inserts 31, 41 dimensioned to engage a portion of an electrical cord or plug 100 for the purpose of removing a plug 101 from an electrical socket 200.

4 Claims, 1 Drawing Sheet

ELECTRICAL PLUG EXTRACTION DEVICE

BACKGROUND OF THE INVENTION

1. Field of the Invention

The present invention relates to the field of electrical plug extraction devices in general, and in particular to a long handled extraction device having plug gripping elements provided on both ends.

2. Description of Related Art

As can be seen by reference to the following U.S. Pat. Nos. 4,210,377; 4,307,924; 5,062,803; and 5,690,508, the prior art is replete with myriad and diverse devices to assist a user in removing an electrical plug from a socket.

While all of the aforementioned prior art constructions are more than adequate for the basic purpose and function for which they have been specifically designed, they are uniformly deficient with respect to their failure to provide a simple, efficient, and practical device to allow a person to either extract or insert an electrical plug relative to an electrical socket.

As most elderly and/or infirm people are all too well aware, the act of removing or installing an electrical plug relative to an electrical socket becomes a real chore due to the need for the user to either bend down or kneel to accomplish that task.

As a consequence of the foregoing situation, there has existed a longstanding need for a new and improved type of plug extraction device that will allow the user to install or remove an electrical plug relative to a socket while remaining standing, and the provision of such a construction is a stated objective of the present invention.

BRIEF SUMMARY OF THE INVENTION

Briefly stated, the electrical plug extraction device that forms the basis of the present invention comprises in general, a handle unit having a pair of extraction units formed on its opposite ends wherein each of the extraction units is adapted to engage an electrical plug to either extract or insert an electrical plug relative to an electrical socket.

As will be explained in greater detail further on in the specification, the handle unit includes a generally rigid elongated handle member having a curved lever portion formed on one end to provide a rolling fulcrum point for the handle member.

In addition, each of the extraction units comprise generally flat V-shaped plug gripping elements whose openings are provided with ridged teeth adapted to grasp a portion of an electrical plug and/or cord adjacent to the electrical outlet.

Furthermore, the openings in each of the plug gripping elements are disposed generally perpendicular to one another both in their orientation to one another and the planes in which they are disposed. One of the plug gripping elements also functions as a hand grip element to facilitate the engagement of the other plug gripping element relative to the electrical outlet.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
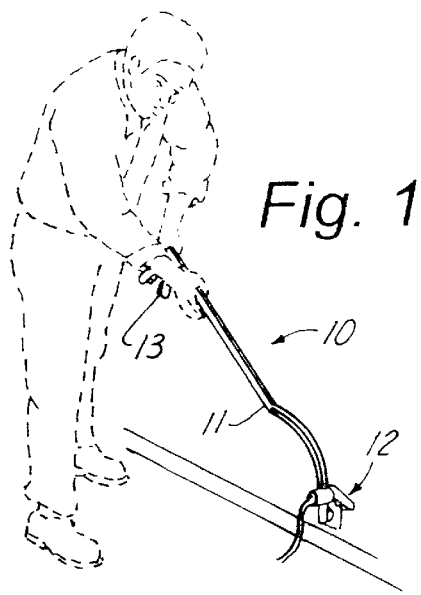
FIG. 1 is a perspective view of the electrical plug extraction device in use.

As can be seen by reference to the drawings, and in particularly to FIG. 1, the electrical plug extraction device that forms the basis of the present invention is designated generally by the reference number 10. The device 10 comprises in general, an elongated handle unit 11 having a pair of extraction units 12 and 13 formed on its opposite ends. These units will now be described in seriatim fashion.

Figure 2:
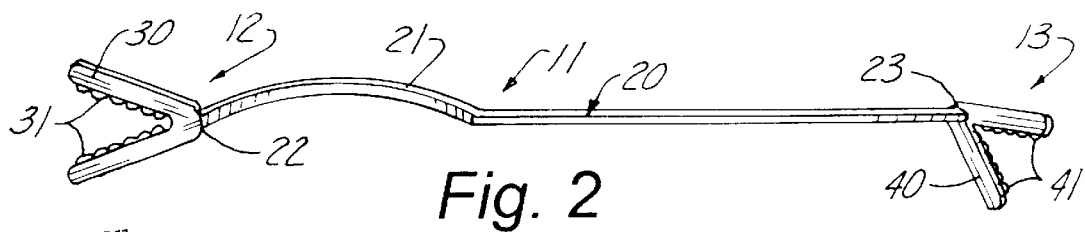
FIG. 2 is a side elevation view of the electrical plug extraction device.
Figure 4:
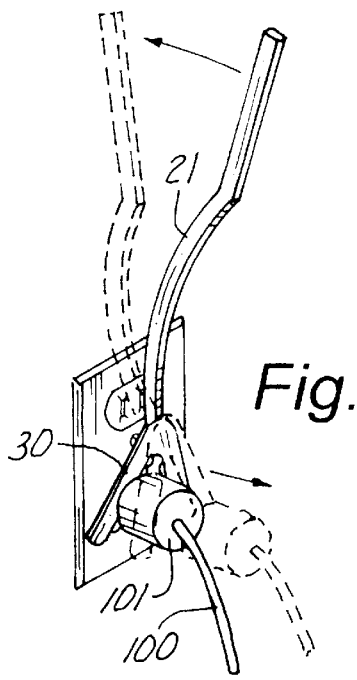
FIG. 4 is an isolated detail view of the other end of the device being used to extract a plug.

As shown in FIGS. 1, 2, and 4, the handle unit 11 comprises an elongated generally rigid handle member 20 having a curved lever portion 21 disposed proximate to a first end 22 of the handle member 20. The second end 23 of the handle member 20 is substantially straight.

Figure 5:
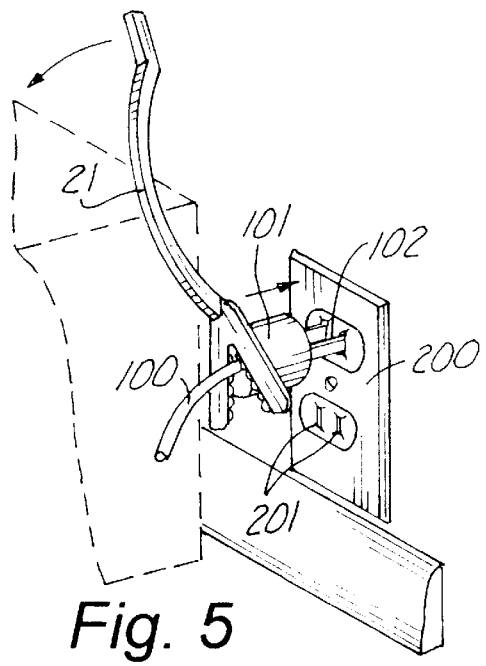
FIG. 5 is an isolated detail view of the device being used to insert a plug into a socket.

Turning now to FIGS. 2, 4, and 5, it can be seen that one of the extraction units 12 is formed on the first end 22 of the handle member 20 and comprises a first generally flat V-shaped cord gripping element 30 wherein the interior of the plug gripping element 30 is provided with a pair of ridged rubberized tooth inserts 31 dimensioned to frictionally engage the periphery of an electrical cord 100 provided with an electrical plug 101.

In addition, the first plug gripping element 30 is further dimensioned to slip between the face of the electrical plug 101 and a wall socket 200 to disengage the prongs 102 of the plug 101 from the electrical socket openings 201 in the wall socket.

Furthermore, as shown in FIG. 2, the opening 31 in the first plug gripping element 30 is generally axially aligned with the longitudinal axis of the substantially straight end 23 of the handle member 20 and the curved lever portion 21 of the handle member 20 is provided to form a lever surface to facilitate both the extraction and insertion of the electrical plug 101 relative to the electrical socket 200 as depicted in FIGS. 4 and 5.

Figure 3:
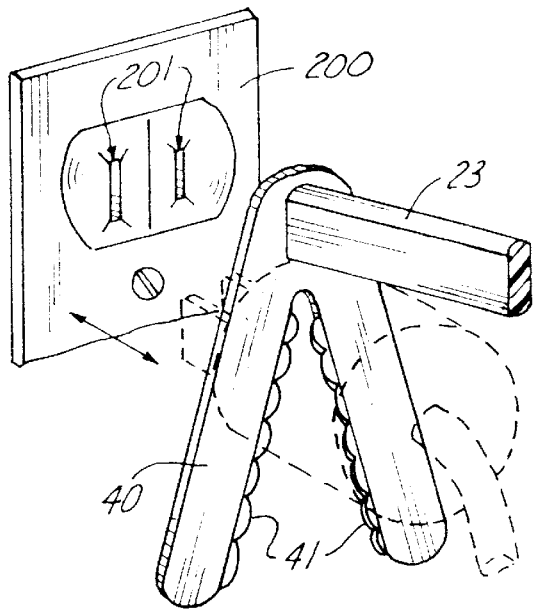
FIG. 3 is an isolated detail view of one end of the plug extraction device.

Turning now to FIGS. 2 and 3, it can be seen that the other extraction unit 13 is formed on the second end 23 of the handle member 20 and comprises a second generally flat V-shaped plug gripping element 40 having a pair of ridged tooth inserts 41. The overall construction of both the first 30 and second 40 plug gripping elements are virtually identical to one another, with the notable exception that the opening in the second plug gripping element 40 is aligned generally perpendicular to both the longitudinal axis of the generally straight second end 23 of the handle member 20 and the plane that the first plug gripping element 30 is disposed in for reasons that will be explained presently.

As can be appreciated by reference to FIG. 1, the generally perpendicular orientation of the second plug gripping element 40 functions as a hand grip that allows the user to maneuver the first plug gripping element 30 relative to the electrical plug 101 and/or cord 100.

As shown in FIGS. 2 through 5, the different orientations of the two plug gripping elements 30 and 40 also allows the user to engage either the cord 100 or the prongs 102 of the plug 101 in either a downward fashion as would be the case with the first plug gripping element 30 or from the side as would be required wit h the second plug gripping element 40.

As can also be seen by reference to FIGS. 4 and 5, the lever portion 21 of the handle member 20 provides a rotating fulcrum that permits the extraction of the plug 101 as shown in FIG.4 or the insertion of the plug 101 as depicted in FIG. 5.

In addition, as shown in FIGS. 3 and 4, the ridged tooth inserts 31, 41 on both of the gripping elements 30 and 40 are also dimensioned to frictionally engage the prongs 102 on the plug 101 and to that end the device 10 is preferably fabricated from a non-conductive material such as hard plastic or the like.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. An electrical plug extraction device for use in engaging and disengaging an electrical cord equipped with a male plug having prongs in an electrical socket having socket openings wherein the device comprises:

an elongated generally rigid handle member having a generally curved first end and a generally straight second end;

a first extraction unit formed on the first end of the handle member and including a generally V-shaped first gripping element having a first opening dimensioned to receive a portion of said electrical plug and/or cord; and wherein said first opening is generally aligned with the longitudinal axis of the straight end of the handle member;

a second extraction unit formed on the second end of the handle member and including a generally V-shaped second gripping element having a second opening dimensioned to receive a portion of said electrical cord and/or plug wherein the second opening is aligned generally perpendicular to the longitudinal axis of the straight end of said handle member.

2. The device as in claim 1 wherein the openings in said first and second gripping elements are disposed in planes aligned generally perpendicular to one another.

3. The device as in claim 1 wherein at least one of said first and second openings is provided with ridged tooth inserts.

4. The device as in claim 1 wherein both of said first and second openings are provided with ridged tooth inserts.

* * * * *